US00RE36787E

United States Patent [19]

Hansen et al.

[11] E Patent Number: Re. 36,787

[45] Reissued Date of Patent: Jul. 25, 2000

[54] HIGH POWER INDUCTION WORK COIL FOR SMALL STRIP SUSCEPTORS

[75] Inventors: Karl A. Hansen, Seattle; C. David Lunden, Federal Way, both of Wash.

[73] Assignee: The Boeing Company, Seattle, Wash.

[21] Appl. No.: 08/588,365

[22] Filed: Jan. 18, 1996

Related U.S. Patent Documents

Reissue of:

[64] Patent No.: 5,313,037
Issued: May 17, 1994
Appl. No.: 07/780,752
Filed: Oct. 18, 1991

[51] Int. Cl.[7] ..... H05B 6/36

[52] U.S. Cl. ..... 219/632; 219/633; 219/642; 336/55; 336/61

[58] Field of Search ..... 219/632, 633, 219/642; 336/55, 57–61, 83, 94, 98, 70; 156/379.7

[56] References Cited

U.S. PATENT DOCUMENTS

| | | | |
|---|---|---|---|
| 2,547,045 | 4/1951 | Sabol | 336/234 |
| 2,547,065 | 4/1951 | Wadhams | 336/61 |
| 3,144,627 | 8/1964 | Dunnabeck et al. | 336/55 |
| 3,183,460 | 5/1965 | Bennon | 336/57 |
| 3,492,453 | 1/1970 | Hurst | 219/10.49 |
| 3,845,268 | 10/1974 | Sindt | 219/10.77 |
| 3,946,349 | 3/1976 | Haldeman, III | 326/62 |
| 3,996,402 | 12/1976 | Sindt | 428/140 |
| 4,029,926 | 6/1977 | Austin | 219/10.49 |
| 4,120,712 | 10/1978 | Sindt | 156/71 |
| 4,296,295 | 10/1981 | Kiuchi | 219/10.49 |
| 4,424,502 | 1/1984 | Kullinger et al. | 336/57 |
| 4,478,669 | 10/1984 | Zeller et al. | 156/379.7 |
| 4,521,659 | 6/1985 | Buckley et al. | 219/633 |
| 4,629,843 | 12/1986 | Kato et al. | 219/624 |
| 4,761,527 | 8/1988 | Mohr | 219/645 |
| 4,904,972 | 2/1990 | Mori et al. | 336/55 |
| 4,947,464 | 8/1990 | Mori et al. | 219/10.79 |
| 4,956,626 | 9/1990 | Hoppe et al. | 336/60 |

*Primary Examiner*—Tu Hoang
*Attorney, Agent, or Firm*—Jones, Tullar & Cooper, P.C.

[57] ABSTRACT

There is disclosed a high power induction heating coil for use in thermoplastic welding where a metallic susceptor is embedded in a composite assembly and is heated by eddy currents generated by the coil. The coil is comprised of several windings of Litz wire composed of multiple individually insulated strands of copper wire. The coil is wound on a circular E core having a coolant conduit through the center of the core. Coolant is introduced through the central core and returned by circulating through the loosely wound coil to the coolant source.

7 Claims, 2 Drawing Sheets

HIGH POWER INDUCTION WORK COIL FOR SMALL STRIP SUSCEPTORS

Matter enclosed in heavy brackets [ ] appears in the original patent but forms no part of this reissue specification; matter printed in italics indicates the additions made by reissue.

BACKGROUND OF THE INVENTION

*1. Field of the Invention*

This invention relates to induction heating coils in general and in particular to such heating coils of small size which can produce high heats for use in thermoplastic welding operations using metallic susceptors to generate heat by eddy current induction.

Induction heating coils used in thermoplastic welding of non-metallic composite parts are often required to be of small size in order to allow their use in restricted places such as those found in aircraft structures. While a small size is desirable, it is often required that the temperature needed to make an effective thermoplastic weld requires relatively high power inputs to the coil. Under these conditions it is necessary to provide outside cooling to the coil to prevent overheating. In the prior art, cooling has been provided by winding the coil on square or round copper tube and running water or other coolant through the tube when the coil is excited. When such tubing is used to support a coil it is nearly impossible to build a small coil of less than one inch in diameter. To construct such a small coil with a tubular core allows only a few turns of wire to be placed around the coil. With so few turns, perhaps as few as three or four, the inductive reactance of the coil is necessarily low making it difficult to match the coil impedance to an RF power supply necessary to excite the coil at the proper frequency. Also, due to skin effect, only a portion of the copper of the windings is effective in carrying the required current thus making the coil losses high and the coil inefficient.

*2. Related Art*

*The following U.S. patents are noted:*

*U.S. Pat. No. 3,183,460 which discloses a transformer for high potential applications having cooling fluid ducts in the insulation used to separate multiple coils.*

*U.S. Pat. No. 3,492,453 which discloses a tube heater having concentric passages in the tubes to form a conduit for cooling fluid.*

*U.S. Pat. No. 3,845,268 discloses an inductive heating coil but without cooling fluid ducts.*

*U.S. Pat. No. 3,946,349 discloses a Litz wire.*

*U.S. Pat. No. 3,996,402 discloses a high power inductive heating coil without cooling.*

*U.S. Pat. No. 4,029,926 discloses an inductive heating element for a cooking appliance without cooling.*

*U.S. Pat. No. 4,120,712 discloses, as does U.S. Pat. No. 3,996,402, a high power inductive heating coil without cooling.*

*U.S. Pat. No. 4,296,295 discloses a heating coil for a cooking appliance like that disclosed in U.S. Pat. No. 4,029,926. Here too there is no cooling.*

*U.S. Pat. No. 4,904,972 discloses a gas insulated induction electrical apparatus in which the core is submerged in a circulating cooling fluid through inlet and outlet openings. No cooling is provided.*

*U.S. Pat. No. 4,947,464 discloses an induction coil for a cooking appliance but without cooling.*

SUMMARY OF THE INVENTION

A high power induction heating coil is disclosed which uses a circular ferrite E core to support multiple, loosely wound windings of a multi-strand wire known as Litzendraht or Litz cable. Such cable is composed of a number of fine, separately insulated strands of copper wire. Use of such wire forces the electrical current to utilize all of the copper available hence minimizing losses in the coil. The coils of Litz wire are wound on a powdered iron or other ferrite core to shape the magnetic field and increase the inductance of the coil assembly. This combination of high inductance and low resistance in the winding produces a coil of very high Q. The center portion of the E core is made hollow to enable coolant to be circulated through the core and returned to the coolant source by circulating through the loosely formed winding. Various modifications of the core geometry allow control of the cooling function to provide an area of concentrated heat on the working surface or to evenly distribute the heat over the entire working surface.

It is therefor an object of this invention to provide a high power induction heating coil having a high inductive reactance with means for integral cooling.

It is another object of this invention to provide an induction heating coil having many turns and allowing maximum use of the copper wire for conduction.

It is yet another object of this invention to provide a high power induction heating coil of small size which can provide high localized heating while maintaining coil temperature within appropriate limits.

DETAILED DESCRIPTION OF THE PREFERRED EMBODIMENT

Figure 1:
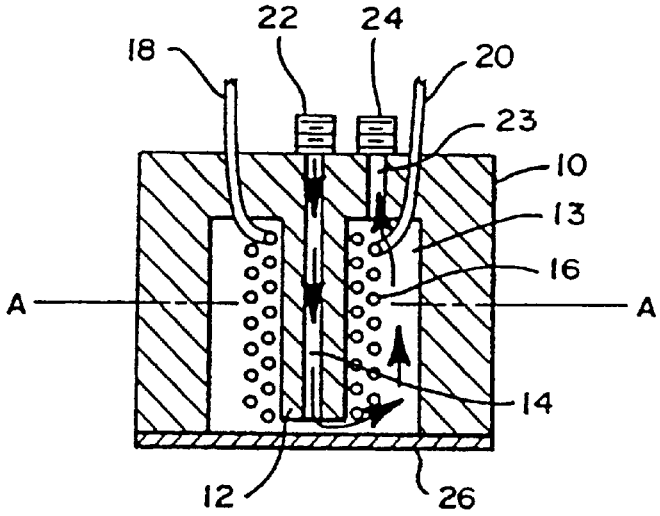
FIG. 1 is a sectional view through the core and coil.
Figure 5:
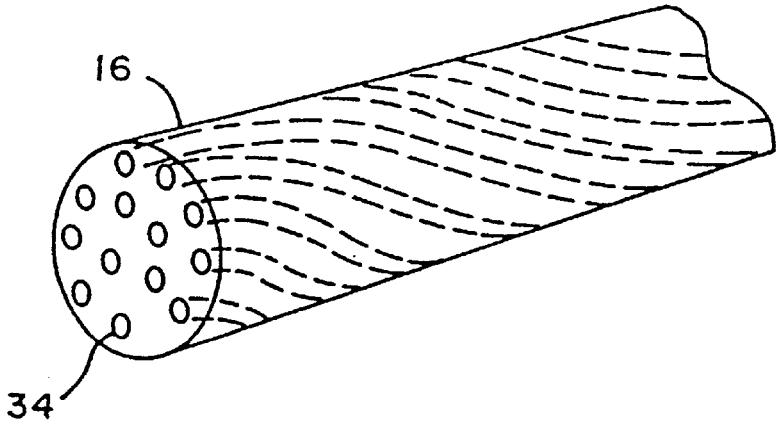
FIG. 5 is a portion of multi strand wire used in the invention.

Referring now to FIG. 1, there is shown a sectional view of an induction heating coil according to the invention. The core member 10 is a circular form of an E core on which the coil is wound. The core is made of a ferrite material or powdered iron. The core 10 defines a central axis A—A, and has a central portion 12 extending through the center and forming a circular coil cavity 13. The core 10 includes a first surface 11 and a second surface 15 spaced from the first surface 11 through the center of the core there is provided a coolant passage 14. This passage is attached to a coolant fitting 22 which is connected to a source of coolant not shown. Adjacent the coolant inlet fitting is a coolant exhaust fitting 24. This fitting is connected to the coil cavity 13 by means of conduit 23. The coil 16 is formed in a loose fashion and contains several turns of Litz wire. Each of the Litz wires is comprised of many strands of fine wire with each strand individually insulated from the others. A schematic drawing of a section of Litz wire is shown in FIG. 5. As shown in FIG. 5, each of the wires 16 which make up the coil winding, is comprised of a plurality of fine copper strands 34 twisted together to form the wire 16. The ends of the coil 16 are brought through the top of the core and are shown at 18 and 20. A sole plate 26 is applied to the bottom, of the assembly and is the means for applying the eddy current generated by the coil to a metallic suscepter contained in the non-metallic composite assembly to be welded.

Figure 4:
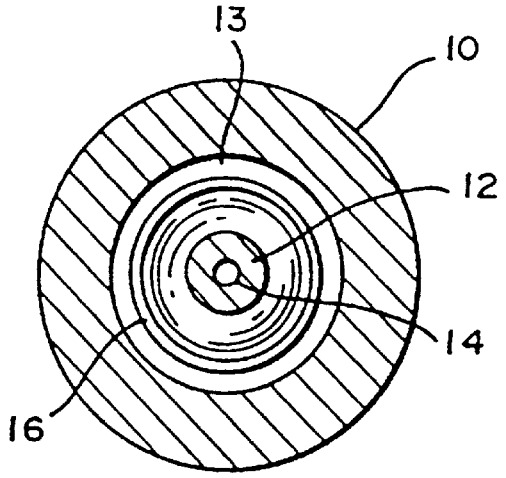
FIG. 4 is a plan view of a cross section of the coil.

FIG. 4 is a sectional view of the embodiment of FIG. 1 taken along line A—A. The circular core is shown at 10 with its central portion 12 having the coolant passage 14 therethrough. The inductive coil is loosely formed in the cavity 13 and is shown at 16.

In operation, the ends of the coil are attached to a source of power of appropriate frequency to cause the coil to generate eddy current heating in the susceptor. The coolant input and output fittings are connected to a coolant source and the coolant is caused to flow through the center portion of the core and is returned to the coolant source through the loosely formed coil to cool the coil and core to prevent overheating of the coil.

Figure 2:
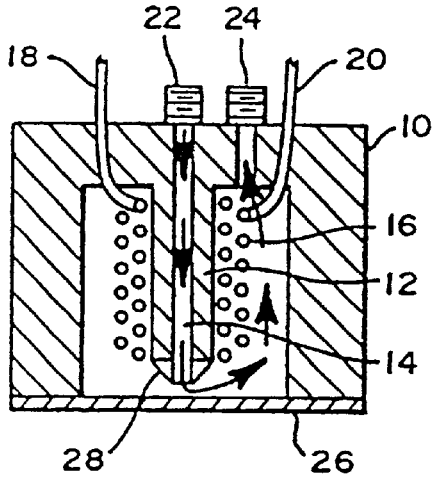
FIG. 2 is another sectional view through the coil showing a modification of the core to alter the cooling effect.

Referring now to FIG. 2, there is shown an embodiment of the device in which the center portion of the core has been modified at its lower end in order to reduce the cooling at the center of the sole plate. In some applications it is desirable to have the sole plate heated as evenly as possible. When the coil is excited, the eddy currents are stronger at the edges of the coil than in the center. By shortening the coolant path by modifying the end of the core center, the center of the sole plate will be at a temperature closer to that of the edges.

Figure 3:
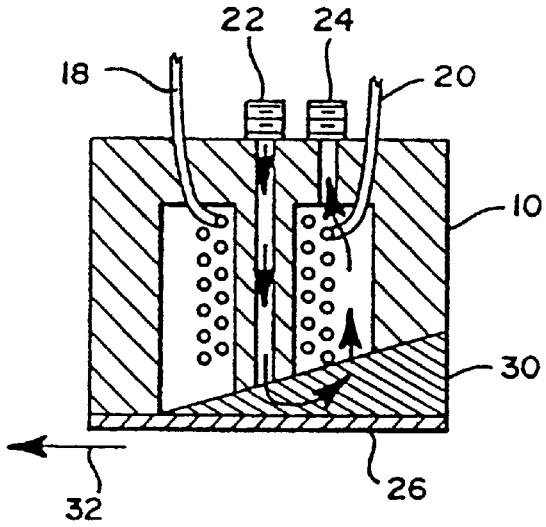
FIG. 3 is another sectional view through the coil showing the addition of a dielectric wedge to localize heating.

In FIG. 3, there is shown a second modification of the core to alter the heating characteristics of the device. In this embodiment, a wedge of dielectric material has been inserted at one side of the coil. With this dielectric wedge in place the eddy current applied to the susceptor will be concentrated at one edge of the device. In using this embodiment of the device, the tool is moved rapidly along the workpiece to be welded in the direction of the arrow 32. As the high current portion of the device passes over the susceptor imbedded in the composite assembly to be welded, the susceptor is heated and the adhesive components are melted and cured completing the welded structure.

Figure 6:
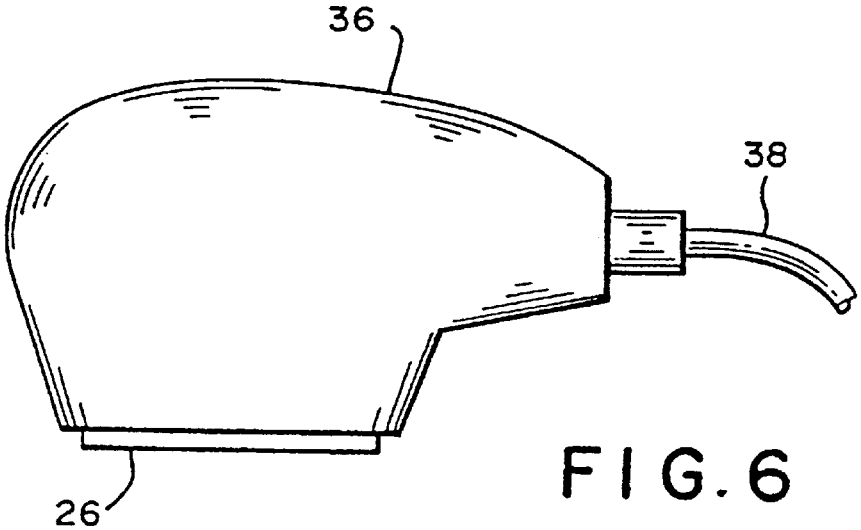
FIG. 6 is an external view of a workpiece utilizing the invention.

FIG. 6 illustrates a simple housing which can be placed over the coil assembly to allow it to be conveniently used in a manufacturing operation. The sole plate 26 is the portion of the device to be applied to the composite structure. A simple housing 36 is attached and provides a connection conduit 38 for carrying the electrical power to the coil and the input and output coolant tubes.

As discussed above, when the device is to be used in aircraft assembly, [rt] *it* is desirable to have as small a device as possible capable of producing sufficient heat for the welding process. An example of such a coil would be one having an effective work area of approximately one square inch. Such a coil made according to the invention would have a coil made up of 25 turns of five number 20 Litz wires wound on a Ferrotron 559 core. The core material is powdered iron in a plastic polymer and is identified by the trade name Ferrotron. This coil was designed to operate at a frequency of about 50 KHz and will provide a power level of up to 1,400 Watts.

Thus it can be seen that the invention described herein can produce an intense magnetic field over a small area and the self enclosed cup-core allows complete cooling of the winding and core. In addition, the device has a relatively high impedance making it possible to use leads of up to 10 feet without serious performance degradation.

What is claimed is:

1. A high power induction coil comprising:

a core of magnetic material having a central axis, first and second surfaces and a length therebetween, said core having an annular ring-shaped cavity extending from said second surface of said core to near the first surface of [is] *said* core and having a central leg approximately in a center of said annular ring-shaped cavity connected to the first surface of the core, said central leg being shorter than the length of said core whereby a sectional view through said core along the central axis forms an E-shaped core with a central leg and opposing side legs;

a sole plate attached to the second surface of the core forming a closure for the annular ring-shaped cavity in the core with a space between a lower end of the central leg and the sole plate;

a first fluid conduit extending through said central leg;

a second fluid conduit for providing a communication between an outside surface of said core with the annular ring-shaped cavity and with said first conduit through the space between the lower end of the central leg and the sole plate;

first and second fluid connectors attached to the first surface of the core, each of said fluid connectors being connected to its respective fluid conduit; and an induction coil wound loosely around the central leg of said core, said coil having first and second ends extending through said first surface of said core*, wherein said core allows for complete cooling of the coil and core, and wherein the high power induction coil produces an intense magnetic field over a small area*.

2. The coil according to claim 1 wherein the inductive coil comprises multiple turns of a plurality of wires, each of said wires being composed of a plurality of individually insulated conductive strands.

3. The coil according to claim 2, wherein the lower end of the center leg of said core is truncated.

4. The coil according to claim 1, further comprising: a wedge shaped member of dielectric material having a thick and a thin edge attached to the sole plate of said core inside said annular ring-shaped cavity, the edge shaped member being placed with its thick end adjacent the outer edge of one side of sole plate and its thin edge terminates at the inside edge of the annular ring-shaped cavity at the opposite side of the core.

5. The coil according to claim 4 wherein the core is composed of ferrite material.

6. The coil according to claim 4 wherein the core is composed of powered iron in a plastic binder.

7. The high power induction coil according to claim 1, wherein said inductive coil is comprised of Litz wire.

* * * * *